July 3, 1923.

W. T. COLLINS ET AL 1,460,367

PUMP CONTROLLED RECORDING APPARATUS

Filed Jan. 19, 1917     5 Sheets-Sheet 1

July 3, 1923.

W. T. COLLINS ET AL 1,460,367

PUMP CONTROLLED RECORDING APPARATUS

Filed Jan. 19, 1917    5 Sheets-Sheet 2

July 3, 1923.

W. T. COLLINS ET AL

PUMP CONTROLLED RECORDING APPARATUS

Filed Jan. 19, 1917      5 Sheets-Sheet 3

1,460,367

Inventors
Wesley T. Collins and
C. B. Adams
By
Their Attorneys

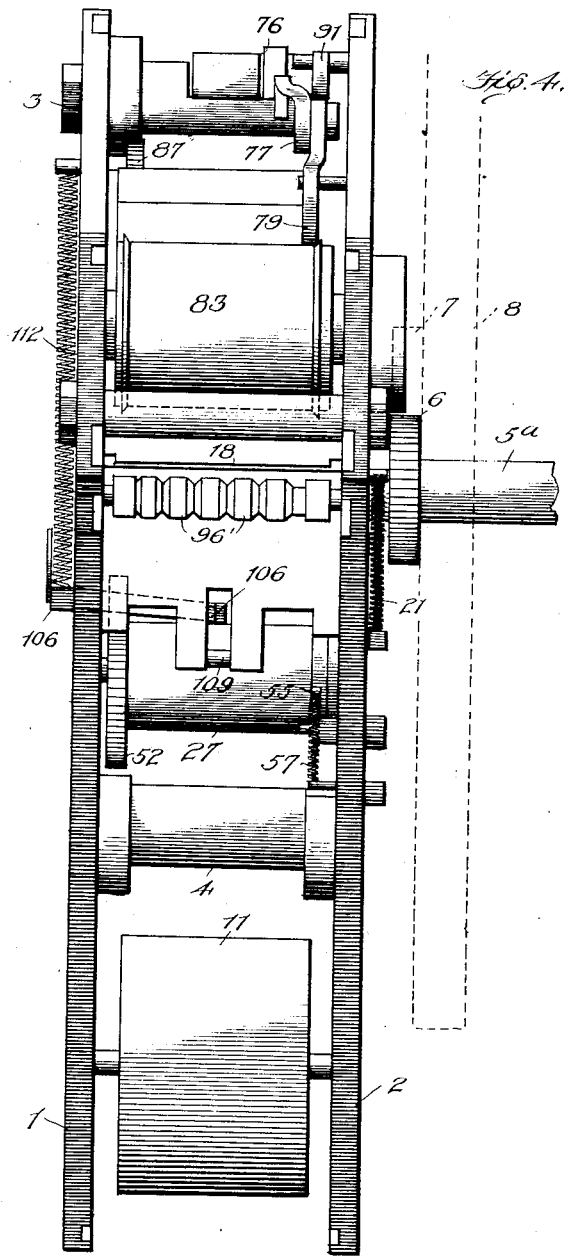

July 3, 1923.
W. T. COLLINS ET AL
1,460,367
PUMP CONTROLLED RECORDING APPARATUS
Filed Jan. 19, 1917   5 Sheets-Sheet 5
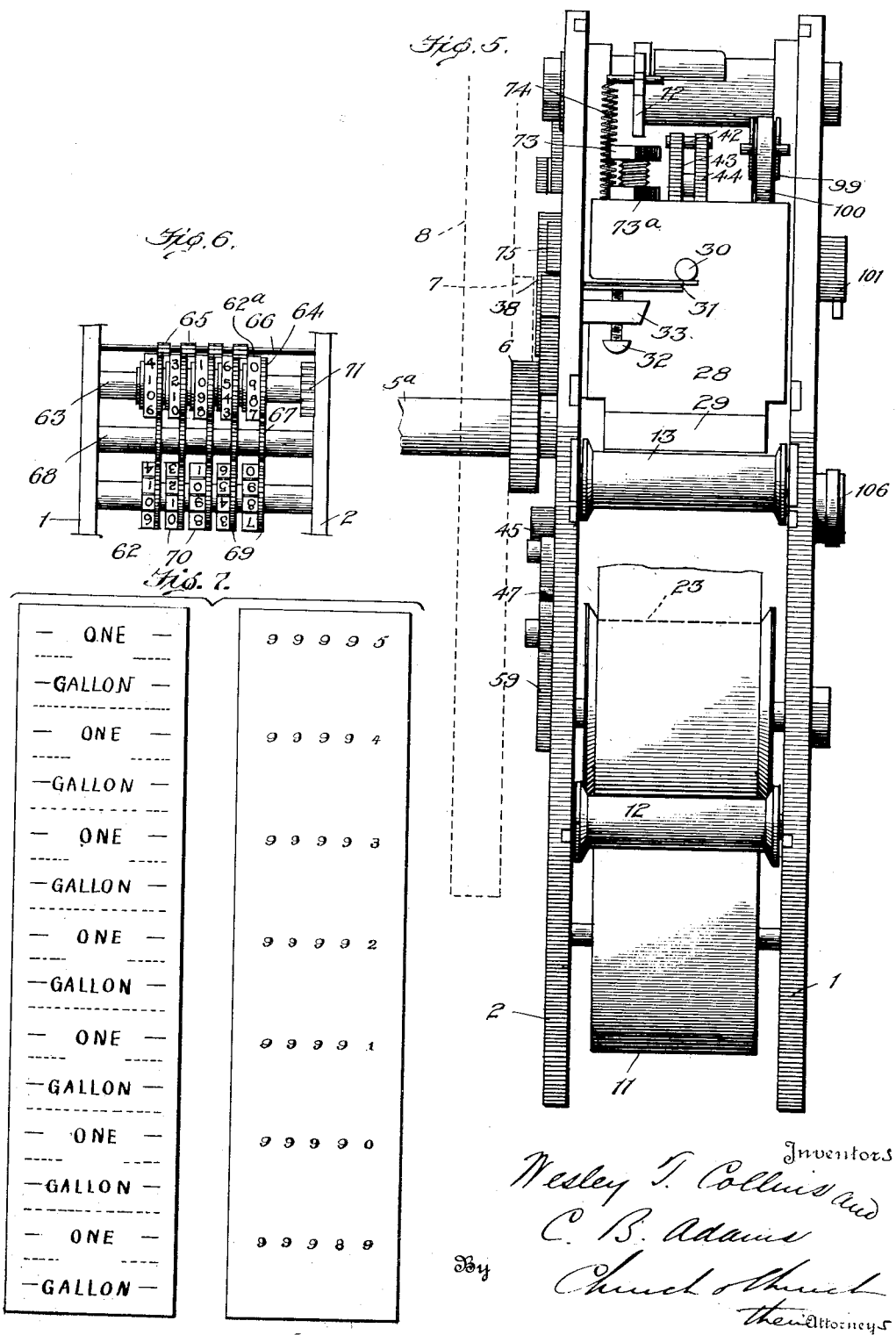

Patented July 3, 1923.

1,460,367

UNITED STATES PATENT OFFICE.

WESLEY T. COLLINS AND CLAUDE B. ADAMS, OF COLORADO SPRINGS, COLORADO, ASSIGNORS TO THE A. C. GAS REGISTER COMPANY, OF COLORADO SPRINGS, COLORADO, A CORPORATION OF COLORADO.

PUMP-CONTROLLED RECORDING APPARATUS.

Application filed January 19, 1917. Serial No. 143,340.

*To all whom it may concern:*

Be it known that we, WESLEY T. COLLINS and CLAUDE B. ADAMS, citizens of the United States, residing at Colorado Springs, in the county of El Paso and State of Colorado, have invented certain new and useful Improvements in Pump-Controlled Recording Apparatus; and we do hereby declare the following to be a full, clear, and exact description of the same, reference being had to the accompanying drawings, forming part of this specification.

The primary object of the present invention is the provision of an efficient though exceedingly simple recording apparatus controlled in its operation by a pump of a type adapted to discharge a measured or predetermined quantity of liquid, whereby operation of the pump for effecting the discharge of such predetermined quantity of liquid, will set in operation a printing mechanism and a mechanism for feeding a strip of material to the printing mechanism, causing thereby printing of the strip of material to denote the quantity of liquid discharged by the pump.

A further object in view is to combine with the above set forth mechanisms a totalizer mechanism also controlled in its operation by the pump, which will indicate the total quantity of liquid discharged by the pump after successive repeated operations of the latter and which may also print a permanent record of the total on the strip of material as the latter is fed through the recording apparatus.

A still further object is to simplify and improve the construction of the feeding and printing mechanisms, with the connections for operating the same, features of the invention which, it will be observed, are applicable to recording apparatus of many types other than the specific embodiment herein described and illustrated.

With the above and other objects in view, the invention consists in certain novel combinations, arrangements, and construction of parts set forth in the claims at the end of the specification. A full understanding of the invention will be attained from the ensuing detailed description, when taken in connection with the accompanying drawings which illustrate a structural embodiment of the invention in a preferred form.

In the drawings:—

Figure 4 is an end elevation looking from the right hand side of Figure 1.

Figure 5 is an end elevation looking from the left hand side of Figure 1.

Figure 6 is a detail view illustrating the totalizer mechanism.

Fig. 7 is a view of the tape as discharged by the device.

Like characters of reference in the several figures indicate the same parts.

Figure 2:
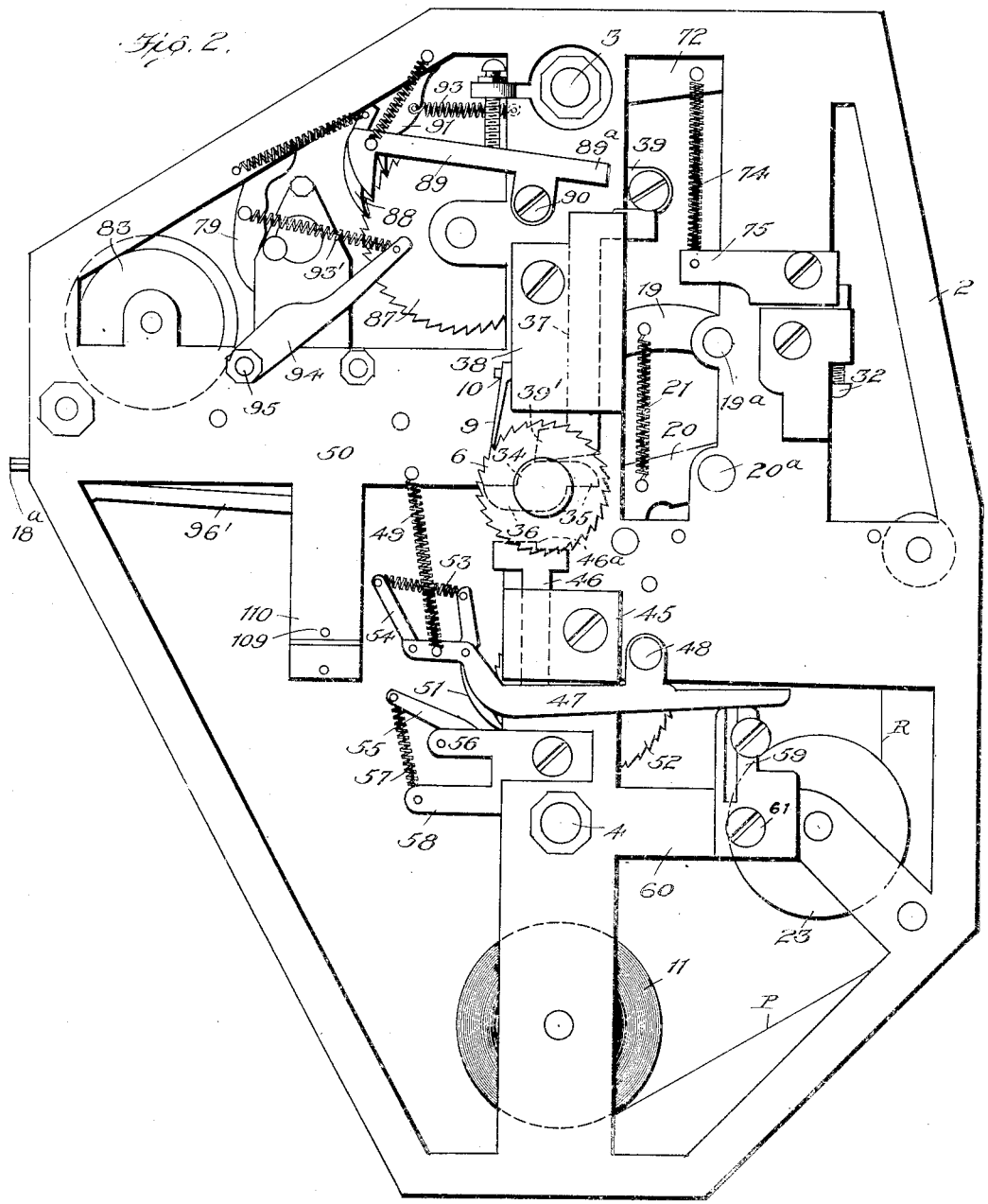
Figure 2 is an elevation of the apparatus looking from the side opposite to that illustrated in Figure 1.

As shown in the accompanying drawings, the frame of the apparatus consists essentially of the two side frame members 1 and 2 held spaced apart by the upper and lower shafts or bolts 3 and 4 and also by other parts of the apparatus, such as the several shafts which are journaled at their ends in the side frame members 1 and 2 and will be hereinafter described. Journaled in the side frame members 1 and 2 is the shaft 5, which may be termed "the main operating element" because it is from this shaft that power is derived to operate the printing and strip feeding mechanisms of the apparatus. It is intended that the shaft 5 be operatively connected with a pump, and for this purpose it is provided at one end with a ratchet 6 (see Figs. 2, 4 and 5), adapted to be engaged by a pawl 7 carried by a large gear wheel 8 of the pump. The gear wheel 8 of the pump is actuated through the pump gearing, when the pump is operated to discharge a predetermined quantity of liquid and in the present embodiment, operation of the pump to discharge one gallon of liquid will impart one-half of a revolution to the large gear wheel 8 and through the intermediary pawl 7 a like movement to shaft 5. Gear wheel 8 and the pawl 7 are indicated by dotted lines in Figures 4 and 5, and the gear wheel is, it will be understood, one of the parts of the pump, and the medium through which the pump controls the operation of the printing and strip feeding mechanisms hereinafter described. The pump itself forms no part of the present invention and hence is not illustrated in the drawings. It may be stated, however, that the present embodiment of the invention is particularly adapted for use in connection with gasoline pumps of a standard type and that, in such pumps, the delivery of one gallon of gasoline will be attended by a one-half revolution of the gear wheel 8. In connecting up the recording apparatus with a pump, the gear wheel 8 is slipped over the outer end 5ª of the shaft 5 and positioned so that pawl 7 will be in engagement with the teeth of the ratchet 6 on the shaft. For preventing reverse rotation of the shaft 5 when the gear wheel 8 of the pump is rotated reversely, a check pawl 9 is secured to the frame at 10 and engages a tooth of the ratchet 6, as shown in Figure 2.

Figure 3:
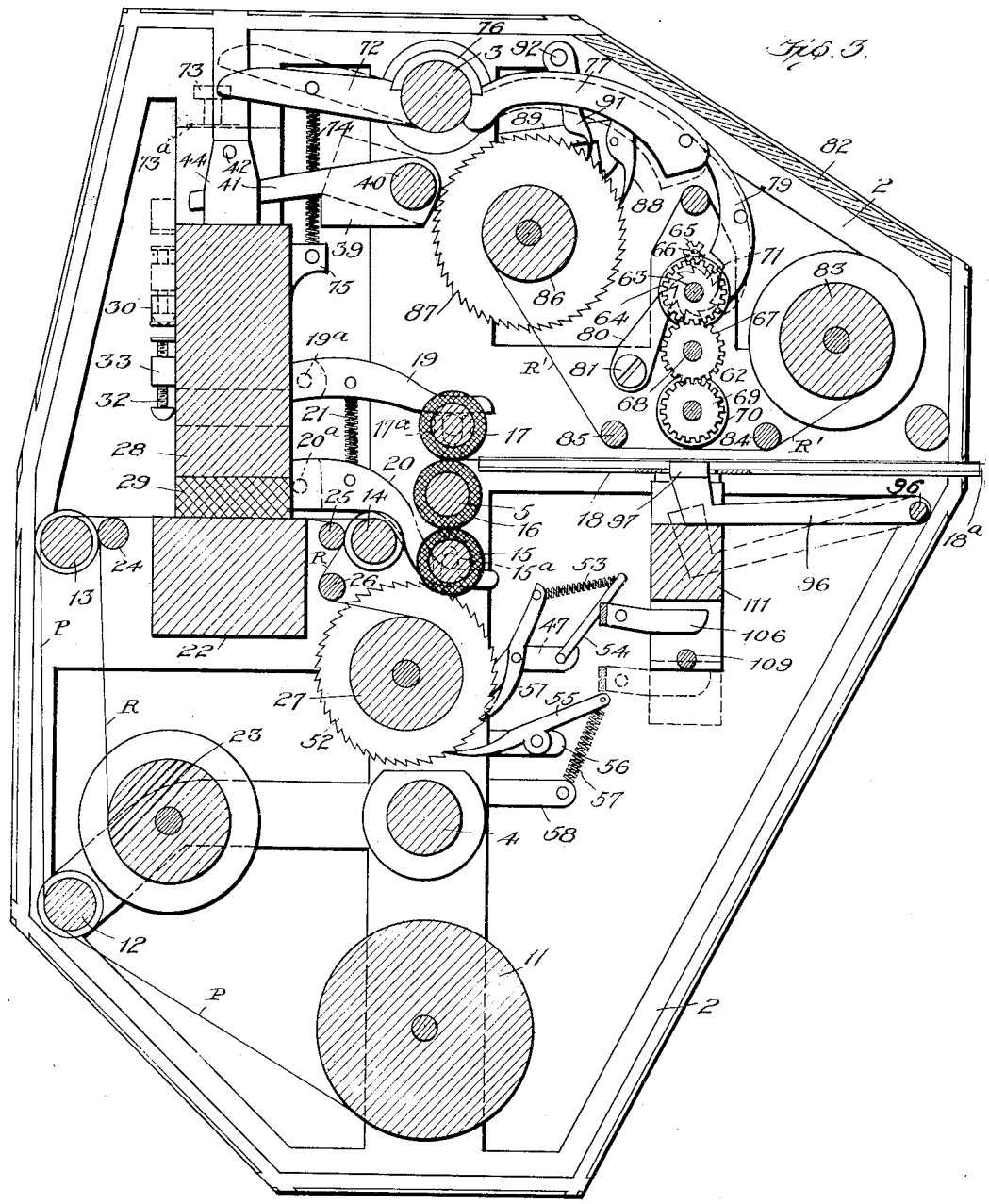
Figure 3 is a central vertical sectional elevation through the frame of the recording apparatus, looking in the same direction as in Figure 1.

The rotation of shaft 5 imparted by the gear wheel 8 of the pump is utilized for the purpose of feeding through the apparatus a strip of material on which the printing is effected. The strip of material, preferably paper, is indicated in the drawings by the reference character P and said strip is supplied from a suitable reel 11 adapted to be mounted in the lower portion of the frame between the side members 1 and 2. From the supply reel 11, the strip of paper P passes to a lower idler or guide roll 12, thence vertically to and over an upper roll 13, from which the strip passes between the fixed and movable instrumentalities of the mechanism for preliminarily printing the strip. After the strip has left the printing mechanism, it is guided by a third idler roll 14 to the lower gripping roll 15, around which the strip P passes and from which it is stripped by the feeding peripheral or roll portion 16 of the power-driven shaft 5, as shown in Figure 3. Above shaft 5 is located another idler roll 17, similar in construction to roll 15, for insuring safe delivery of the strip of paper P to the guide plate 18 over which the strip of paper passes out of the apparatus. A proper gripping surface for the paper may be afforded by covering the rolls 15, 16 and 17 with rubber or felt, as shown in Fig. 3. Idler rolls 15 and 17 are journaled respectively in slotted bearings 15ª, 17ª in the frame members 1 and 2, see Figure 3, and pressed towards the intermediate power driven roll 16 by spring-actuated arms 19, 20, bearing respectively on the idler rolls 15, 17. These arms are respectively pivoted to the frame at the points 19ª, 20ª and are connected by a spring 21 which maintains their free ends in contact with the idler rolls 15, 17, to urge the latter towards the intermediate roll 16, as above set forth. The power driven roll 16 being a part of the shaft 5, every forward rotary movement imparted to said shaft by the connection with the pump, hereinbefore set forth, will operate to feed the strip through the apparatus, with a continuous slow motion. The strip P passes over the guide 18 and out of the apparatus at the point 18ª, where the projecting end of the strip may be torn off.

In the present embodiment of the invention, two printing mechanisms are provided, one adapted to print on the strip of paper the amount of liquid discharged by a single operation of the pump, preferably the unit of measure of the liquid, and the other adapted to print on the strip the total amount of liquid discharged after repeated successive operations of the pump. The printing mechanism first-mentioned above will now be described. Secured to the frame between the idler rolls 13 and 14 and beneath the strip of paper P is a suitable block 22 adapted to support in its upper face type denoting the quantity of liquid which is discharged by a single operating stroke of the pump. As hereinbefore stated, the pump may be geared whereby operation of the pump to impart one-half a revolution to gear 8 and shaft 5 will discharge a gallon of liquid or gasoline from the pump. Hence, for convenience, it will be assumed that the unit of measure of the liquid will be a gallon and that the type in the block 22 will print the words "One gallon" or the like, on the strip of paper for every one-half revolution of the shaft 5, and every time a gallon of liquid is discharged by the pump. Provision is made for feeding an inked ribbon R between the strip of paper P and the type at the upper end of the supporting block 22. The ribbon R passes from a supply reel 23 suitably journaled between the frame members, vertically to and over a guide roll 24, next under the paper strip P, around a second guide roll 25, around a third guide roll 26, and finally to the take-up roll 27 on which the ribbon is rewound. Impression of the type on the under side of the paper strip P is effected at the proper time by the descent of an impression block 28, properly weighted and slidably mounted between the side frame members 1 and 2 in any suitable manner. A proper yielding impression face is attained at the lower end of the impression block by securing thereto a strip of felt or other resilient, springy material 29. Projecting from the rear vertical face of the block 28 is a stud or pin 30, adapted normally to engage a leaf spring 31 secured to the left-hand frame member 2, as shown in Figure 5. The tension of the spring 31 may be regulated by a thumb-screw 32, which screws in a small bracket plate 33, projecting laterally from the side frame member 2. Normally, the tension of the spring 31 is regulated, so that the engagement of stud 30 with the spring will keep the lower face of the impression block 28 just clear of the paper strip P, and also will effect a quick return of the impression block to its normal position, thereby preventing the impression block from interfering with the continuous feed of the paper strip P.

As the strip of paper P feeds continuously while the shaft 5 is being rotated, and printing of the strip is effected for every one-half rotation of the shaft 5, an exceedingly quick impression making stroke must be made by the impression block 28, followed by an almost instantaneous return of the block to a position above the forwardly moving strip of paper. In the present embodiment, this result is attained by elevating the impression block and suddenly releasing it whereby the block will descend by gravity to make the impression stroke, the block being heavily weighted so as to make a rapid descent. The force of the spring 31 will be temporarily overbalanced by the force of the descending impression block to permit the latter to push the paper strip P and the ribbon R into impression-making contact with the type. However, the spring 31 will almost immediately return the block to normal position, wherein it clears the paper strip.

The impression block 28 is elevated into position for making its descending impression stroke, and the inked ribbon R is intermittently fed forward so as to present a fresh surface for each succeeding printing operation, by the following connections with the main operating element or power driven shaft 5. Secured to the shaft 5 is a cam 34 (see Figure 2) having oppositely projecting cam arms or faces 35 and 36. A vertical thrust rod 37 is slidably mounted in a bracket 38 secured to frame member 2, and said thrust rod is provided at its lower end with a finger 39' for engagement with a cam face 35 or 36. A one-half rotation of shaft 5 in a counter-clockwise direction will, through the engagement of cam face 35, for instance, lift the thrust rod 37 and then permit the latter to fall back into engagement with the other cam face 36, which has been rotated into the position formerly occupied by cam face 35. Continued rotation of the shaft 5 will, therefore, successively elevate and release the thrust rod 37, by means of the cam faces 35, 36, there being two elevating movements accompanied by quick-releases for every complete counter-clockwise rotation of the shaft 5. The upper end of the thrust rod 37 is adapted to engage and lift a rocker arm 39 on a rock shaft 40 (see Figure 3). Also mounted on the rock shaft 40 is an arm 41 adapted to engage a lateral pin or stud 42 mounted between and secured to a pair of spaced fixed uprights 43, 44, on the top of the weighted impression block 28. The lifting movement of rocker arm 39 is transmitted by rock shaft 40 to arm 41, and, hence, every vertical thrust imparted to thrust bar 37, will lift the impression block 28, and suddenly release the latter, at the moment the thrust bar 37 is released by a cam face 35, 36, as hereinbefore set forth. When the thrust bar is released the impression block descends to make its impression stroke and the arms 39, 41, return by gravity to their normal positions.

For intermittently advancing or feeding the inked ribbon R the following instrumentalities are employed. Slidably mounted in a bracket plate 45 on frame member 2 is a second thrust bar 46 located beneath the shaft with its upper end positioned to be engaged by the cam faces 35, 36 and its lower end in engagement with the horizontal arm of a lever 47 pivoted at 48 to said frame member 2 (see Figure 2). A spring 49 connecting said lever 47 with the horizontal fixed frame bar 50 serves to keep the horizontal arm of said lever in normal position in engagement with the lower end of the thrust bar 46. Pivoted to lever 47 is a pawl 51 engaging a tooth of a ratchet 52 forming one of the side plates of the take-up reel 27, for the inked ribbon R. The pawl is pressed into engagement with a tooth of the ratchet 52 by a spring 53 connecting the upper end of the pawl with an arm 54 mounted on the lever 47. A check pawl 55 is pivoted to a horizontal fixed bracket arm 56 and held in engagement with ratchet 52 by a spring 57 connecting the outer end of said pawl with a second horizontal bracket arm 58, located beneath bracket arm 56. The check pawl 55 prevents reverse rotation of the ratchet 52 when the operating pawl 51 has completed a forward rotation of said ratchet and reel 27 and is returning to position to effect another rotation of the ratchet.

The operation of the above described ribbon feeding mechanism is as follows: On each one-half rotation of the shaft 5 a cam face 35, 36 will be brought into engagement with the upper end of thrust bar 46, and the movement of the cam will impart a downward thrust to the bar 46 which will move the horizontal lever arm 47 downwardly. Downward movement of said lever arm will cause the operating pawl 51 to impart a slight forward turn to the ratchet 52 and the take up reel 27, thereby effecting a forward feeding movement of the ribbon. When a cam face 35, 36, is rotated away from the upper end of thrust bar 46, the thrust bar, lever arm 47 and pawl are returned to normal position by the action of spring 49. Preferably the upper end of thrust bar 46 is cut away as shown at 46ª and the edge of a cam face 35, 36 will reach the cut-away portion 46ª before thrust bar 37 has been released. Thus the inked ribbon will be stationary while the impression block 28 is making its impression stroke. The amount of movement imparted by lever 47 and the operating pawl to the ratchet 52 at a single operation may be adjusted by a stop 59 slidably mounted on the horizontal arm 60 of the frame member 2 and adapted to be locked in adjusted position by a thumb screw 61. The position of stop 59 determines the normal position of the lever 47, as will be apparent from an inspection of figure 2, and hence the normal position of the thrust bar 46. By lowering stop 59, thrust bar 46 may be shifted towards the cam faces 35 or 36 and the length of the stroke of thrust bar 46 increased, or the opposite effect may be produced by elevating stop 59.

As hereinbefore stated, provision is made for printing on the strip of paper P the total amount of liquid which has been discharged after the total number of operations of the pump, or the operating element 5. Thus a record is made not only of the quantity discharged by the pump at a single operation but also of the total amount discharged by the pump. This will enable the operator of the pump to keep an accurate check on all liquid sold, whether in an individual sale, or the total number of sales. The mechanism for printing or recording on the strip the total amount of liquid discharged by the pump will now be described. Mounted between the side members 1 and 2 of the frame is a register 62 illustrated more particularly in Figure 6 of the drawings and of any preferred type having "units" "tens" and "hundreds" wheels, etc. In the present instance, the register consists of five wheels, from a "units" to a "ten thousands" wheel, all mounted on the shaft 63. The several wheels are provided with gears 64 and in mesh with the gears of the wheels indicating denominations above "units" are pinions 65 on a shaft 66, located above the number wheels. The operation of a register of the above type is well-known to those skilled in the art, it being sufficient to state that every ten-steps of the "units" wheel imparts a one-step movement to the "tens" wheel through the connecting pinion 65 and gear 64 of the "tens" wheel. The same is true of the "tens" wheel with relation to the "hundreds" wheel and so on. The several wheels are provided with the usual digits for indicating the total registered. In mesh with the gears 64 of the number wheels are gears 67 on a shaft 68, and the gears 67 in turn mesh with the gears 69 of printing wheels 70 provided with type faces corresponding to the digits of the number wheels. Movement of the number wheels to indicate a given total will through the intermediary gears 67 rotate the several printing wheels a corresponding amount, whereby the type of the printing wheels is set for making an impression of the same total on the paper strip P, in the manner which will hereinafter appear.

The means for actuating the several number wheels and printing wheels of the register will now be described. The "units" number wheel 62ª is secured in any preferred manner to the shaft 63 and also secured to said shaft is a ratchet 71 having ten teeth. It is intended that said ratchet be moved a distance equal to one tooth or one-tenth of a revolution, and concurrently the "units" wheel 62ª every time a gallon of liquid is discharged by the pump, i. e., for every one-half revolution of the main power-driven shaft. To accomplish this result, a lever arm 72 is mounted on the upper rock shaft 3 and the free end of said lever arm extends over the weighted impression block 28 so as to lie in the path of an adjustable stop 73 mounted on the top of said impression block. Said stop consists preferably of a thumb-screw mounted in a base 75ₐ, as shown more particularly in Figure 5. Lever arm 72 is held normally in depressed or lowered position by a spring 74 connecting said lever arm with a fixed horizontal bracket 75. On rock shaft 3 is a projection 76 to which is connected an operating lever 77, and pivoted to said operating lever is a pawl 79 for engagement with a tooth of ratchet 71. A check pawl 80 pivoted at 81 to frame plate 2 prevents reverse rotation of the ratchet 71.

The operation of the above described register operating mechanism is as follows:

When the impression block 28 is elevated through the connections with a cam 35, 36, stop 73 is brought into engagement with lever arm 72, thereby elevating the latter and rocking shaft 3 so as to throw operating lever 77 to the position indicated by dotted lines in Figure 3. This movement of the operating lever 77 is effective to move the ratchet 71 the space of one tooth and add one digit to the register 62. On release of the impression block 28 in the manner hereinbefore set forth, the spring 74 will return levers 72, 77 to their normal elevated positions. Check pawl 80 prevents reverse rotation of the ratchet 71 and the wheels of the register when the parts are returning to normal position. It will be observed that for every one-half rotation of the shaft 5, i. e., for every gallon of liquid discharged by the pump, a unit is added to the register. The total may be observed through a glass plate, indicated at 82 in the front of the frame.

It is also desirable, however, that the total be printed on the paper strip P before the latter passes out of the apparatus, and this result may be accomplished as follows: Beneath the type wheels 70 of the register and above the paper strip P in the guide 18 is located an inked ribbon R', for printing the total set on the type wheels 70 on the upper side of the paper strip. The inked ribbon R' is fed from a supply reel 83 journaled between the side frame members and under spaced guide rolls 84, 85, located respectively on opposite sides of the type wheels 70, from which the ribbon is rewound on a take-up reel 86 also journaled between side frame members. One of the side plates of the take-up reel is in the form of a ratchet 87 adapted to be engaged by an operating pawl 88 pivoted on the end of a rock arm 89. The latter is pivoted at 90 to the side frame member 2 (as shown in Figure 2) and its end 89ª is positioned to lie in the path of thrust bar 37, as the thrust bar is elevated in the manner hereinbefore described. Accordingly, elevation of the thrust bar 37 will depress the pawl 88, thereby imparting a slight rotary movement to the take-up reel, for every one-half rotation of the main power shaft 5, and a new portion of the inked ribbon R' will be presented for each succeeding impression to be made by the type wheels 70. Reverse rotation of ratchet 87 is prevented by means of a check pawl 91 pivoted at 92 to frame 2 and held by the spring 93 in engagement with a tooth of the ratchet 87. The pawl 79 is held against the ratchet wheel 71 by means of a spring 93' anchored to an arm 94 which is adjustably mounted on a bolt 95 so that the arm 94 may be swung to the desired angle to give the proper tension to the spring 93' whereupon the nut on the bolt 95 may be tightened to secure the arm 94 permanently in place.

Figure 1:
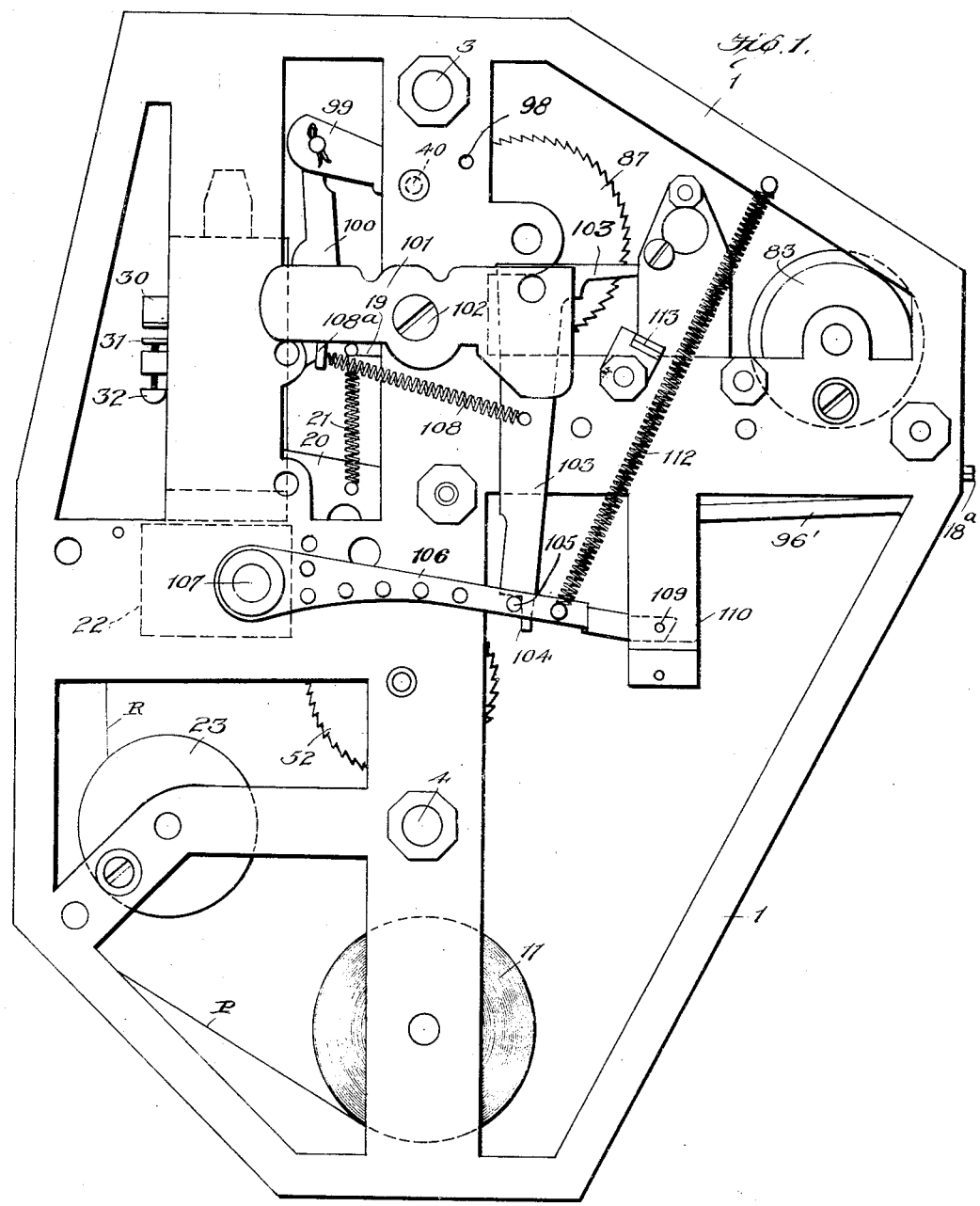
Figure 1 is a side elevation of a pump-controlled recording apparatus constructed in accordance with the present improvements.

For making the impression of the total set by the type wheels 70 on the upper side of the paper strip P, the following mechanism is provided: Pivoted at 96 to the frame members are arms 96' supporting at their free ends impression hammers 97, preferably faced with a yielding or springy material such as felt, or the like. Normally, the arms 96' drop by gravity into a position disengaged from the paper but are adapted to be elevated to make the impression of the type on wheels 70 by the action of a weight coupled with a springy action and controlled by the cams 35, 36, whereby an impression will be made for every one-half rotation of the power driven shaft 5. Pivoted at 98 to casing plate 1 is a lever 99, which is adapted to be engaged by thrust bar 37 when the latter is elevated by a cam 35, 36. The said lever 99 is pivotally connected by a link 100, with one end of rocker block 101, pivoted at 102 to frame plate 1, as shown in Figure 1. Pivoted to the opposite end of said rocker block 101 is a depending arm 103, having at its lower end a hook or catch 104 adapted for engagement with a lug 105 projecting laterally from a horizontal arm 106, the latter being pivoted at 107 to the frame member 1. A spring 108 connecting arm 103 with a post 108ª depending from rocker block 101 maintains the catch 104 of arm 103 normally in engagement with the lug 105 of arm 106. The free end of arm 106 is adapted to engage a lateral pin or stud 109 secured between depending members 110 at the lower end of a weight 111, slidably mounted in any suitable manner between the frame members 1 and 2. The upper end of the weight is adapted to engage the hammers 97. Near its free end the arm 106 is connected by means of a spring 112 with the upper portion of frame member 1, the tension of said spring being sufficiently strong to elevate the weight and arm, causing the weight to strike hammers 97 and impart to the latter a quick sharp blow which forces the paper strip P and ribbon R' into impression-making engagement with the type of wheels 70. This is accomplished by suddenly disengaging arm 103 from horizontal arm 106, during the lowering movement of arm 103. For this purpose there is positioned to lie in the path of arm 103 a stop 113 adapted to strike arm 103 and release catch 104 from engagement with lug 105 of arm 106, at the end of the lowering movement of arm 106 and the weight 111.

In operation, elevation of the thrust bar 37 will elevate lever 99 and through link 100 depress the end of rocker block 101 which is connected to arm 103. As the latter is held in engagement with arm 106 by the cooperating catch 104 and lug 105, arm 106 will be lowered, also lowering the weight 111. When arm 103 reaches a position in its travel wherein the arm engages stop 113, the arm 103 is shifted to release catch 104 from engagement with lug 105, thereby freeing arm 106. The spring 112 which has been placed under tension by the lowering movement of arm 106 then acts immediately to lift arm 106 and the weight 111 imparting a quick sharp blow to the impression hammers 97. After the impression is made the hammers instantly drop back beneath and clear of the paper strip P so that no interference is offered to the feeding movement of the paper strip. The weight is held in its normal position just beneath the hammers 97 by spring 112 and spring 108 restores the catch 104 into engaging position with lug 105 when thrust bar 37 is released.

With the above-described apparatus, a portion of the paper strip P, having printed on one side of the strip the words or insignia indicating the unit of measure is projected from the apparatus at the point 18ª every time such unit of measure is discharged by the pump. On the other side of the strip is printed the total number of units discharged. For example, if one gallon of liquid such as gasoline is discharged, a strip of paper will be projected bearing on one side the words "One gallon" and on the other side the total number of gallons discharged up and to including the quantity just discharged. If five gallons are discharged instead of one, the strip projected will bear the words "One gallon" repeated five times, and there will be five totals printed on the other side of the strip. The highest total, of course, will indicate the total number of gallons discharged for all sales up to date.

What is claimed is:—

1. In a pump-controlled recording apparatus, the combination of a printing mechanism, mechanism for feeding a strip of material to said printing mechanism, and a main operating element adapted to be operatively connected with a pump and having operating connections with the printing and strip feeding mechanisms, said operating element adapted, when the pump is operated to discharge a predetermined unit quantity of liquid, to operate the printing and strip feeding mechanisms, causing thereby feeding of the strip of material and printing of the same each time a measured unit quantity of liquid is discharged.

2. In a pump-controlled recording apparatus, the combination of a printing mechanism, mechanism for feeding a strip of material to said printing mechanism, a main operating element adapted to be operatively connected with a pump and having operating connections with the printing and strip feeding mechanisms, said operating element adapted, when the pump is operated to discharge a predetermined unit quantity of liquid, to operate the printing and strip feeding mechanisms, causing thereby feeding of the strip of material and printing of the same each time a measured unit quantity of liquid is discharged, a registering means operatively connected with said main operating element for indicating the total number of unit quantities of liquid discharged by the pump after successive operations of the latter, and means for printing such total on the strip of material.

3. In a pump-controlled recording apparatus, the combination of a printing mechanism, mechanism for feeding a strip of material to said printing mechanism, a main operating element adapted to be operatively connected with a pump and having operating connections with the printing and strip feeding mechanisms, said operating element adapted, when the pump is operated, to discharge a predetermined unit quantity of liquid, to operate the printing and strip feeding mechanisms, causing thereby feeding of the strip of material and printing of the same each time a measured unit quantity of liquid is discharged, a registering means operatively connected with said main operating element for indicating the total number of unit quantities of liquid discharged by the pump after successive operations of the latter, and means controlled in its operation by the main operating element for printing on the strip of material the total indicated by the register.

4. In a pump-controlled recording apparatus, the combination of a printing mechanism, mechanism for feeding a strip of material to said printing mechanism, a main operating element adapted to be operatively connected with a pump and having operating connections with the printing and strip feeding mechanisms, said operating element adapted, when the pump is operated to discharge a predetermined unit quantity of liquid, to operate the printing and strip feeding mechanisms, causing thereby feeding of the strip of material and printing of the same each time a measured unit quantity of liquid is discharged, a registering means operatively connected with said main operating element for indicating the total number of unit quantities of liquid discharged by the pump after successive operations of the latter, and means operable concurrently with the unit printing mechanism for printing on the strip of material the total indicated by the register.

5. In a recording apparatus, printing mechanism, means for continuously feeding a strip of material to said printing mechanism, a spring-actuated means for normally preventing contact of the printing mechanism with said strip, and means operative as each unit of the material to be accounted for is delivered for effecting by gravity a momentary impression-making engagement of the printing mechanism with the strip of material while the latter is being fed continuously.

6. In a recording apparatus, printing mechanism embodying a fixed and a movable element adapted to be impelled towards the fixed element, means for continuously feeding a strip of material between the fixed and movable elements of the printing mechanism, and means operative as each unit of the material to be accounted for is delivered for moving said movable element away from the fixed element and releasing the latter, whereby the movable element is impelled towards the fixed element, and a momentary impression-making engagement of the two elements with the strip is effected.

7. In a recording apparatus, means for continuously feeding a strip of material, printing mechanism embodying a fixed and a movable element located respectively on opposite sides of the strip of material and normally disengaged from the latter, and releasable spring-actuated means operative as each unit of the material to be accounted for is delivered for imparting a thrust to the movable element for effecting a momentary impression-making engagement of both elements with the strip of material.

8. In a recording apparatus, means for continuously feeding a strip of material, printing mechanism embodying a fixed and a movable element located respectively on opposite sides of the strip of material and normally disengaged from the latter, the movable element being adapted to effect by gravity a momentary impression-making engagement of both elements with the strip of material, and means operative as each unit of the material to be accounted for is delivered for moving and releasing said movable element, causing thereby movement by gravity of the movable element to effect such engagement.

9. In a recording apparatus, printing mechanism including a type-carrying element, an impression block and means for feeding an inked ribbon between the type-carrying element and the impression block, a power shaft, means operative as each unit of the material to be accounted for is delivered operatively connected with said power shaft for feeding a strip of paper between the inked ribbon and the impression block, and a connection controlled in its operation by the power shaft for intermittently effecting an impression-making thrust of the impression block, substantially as described.

10. In a recording apparatus, printing mechanism including a type-carrying element, an impression block movable by gravity into impression-making engagement, and means for feeding an inked ribbon between the type-carrying element and the impression block, a power shaft, means operative as each unit of the material to be accounted for is delivered operatively connected with said power shaft for feeding a strip of paper between the inked ribbon and the impression block, and a connection controlled in its operation by the power shaft for elevating and releasing said impression block.

11. In a recording apparatus, printing mechanism including a type-carrying element, an impression block movable by gravity into impression-making engagement and means for feeding an inked ribbon between the type-carrying element and the impression block, a power shaft, means operative as each unit of the material to be accounted for is delivered operatively connected with said power shaft for feeding a strip of paper between the inked ribbon and the impression block, a spring actuated device for maintaining the impression block normally clear of the strip of paper, and a connection controlled in its operation by the power shaft for elevating and releasing said impression block.

12. In a recording apparatus, printing mechanism including a type-carrying element, an impression block movable by gravity into impression-making engagement, and means for feeding an inked ribbon between the type-carrying element and the impression block, a power shaft, means operatively connected with said power shaft for feeding a strip of paper between the inked ribbon and the impression block, a connection controlled in its operation by the power shaft for elevating and releasing said impression block, a totalizing register, and a connection operated by the elevation of the impression block for imparting a one-step movement to the register as each unit is recorded.

13. In a recording apparatus, printing mechanism including a type carrying element, an impression block movable by gravity into impression-making engagement, and means for feeding an inked ribbon between the type-carrying element and the impression block, a power shaft, means operatively connected with said power shaft for feeding a strip of paper between the inked ribbon and the impression block, a connection controlled in its operation by the power shaft for elevating and releasing said impression block, a totalizing register, a connection operated by the elevation of the impression block for imparting a one-step movement to the register, thereby indicating a total, and means controlled in its operation by the power shaft for printing the total on the strip of paper as each unit is recorded.

14. In a recording fluid dispensing apparatus the combination with the record strip thereof, of means for printing quantity denoting marks upon said strip only during the discharge of fluid therefrom.

15. In an apparatus of the character described, the combination of fluid dispensing means, recording means, record strip holding means, and means, operable only during delivery of fluid, for printing quantity denoting marks upon said record strip.

16. In a recording fluid dispensing apparatus, the combination of means for printing quantity denoting marks upon the record strip thereof during discharge of fluid therefrom and for advancing said record strip approximately corresponding to the amount of such discharge, and separate means for placing upon said record strip marks from which the amount of discharge may be computed.

WESLEY T. COLLINS.
CLAUDE B. ADAMS.